W. T. ROLLINS.
ANTISKID ATTACHMENT FOR ELASTIC TIRES.
APPLICATION FILED FEB. 10, 1921.
1,397,182.
Patented Nov. 15, 1921.
2 SHEETS—SHEET 1.
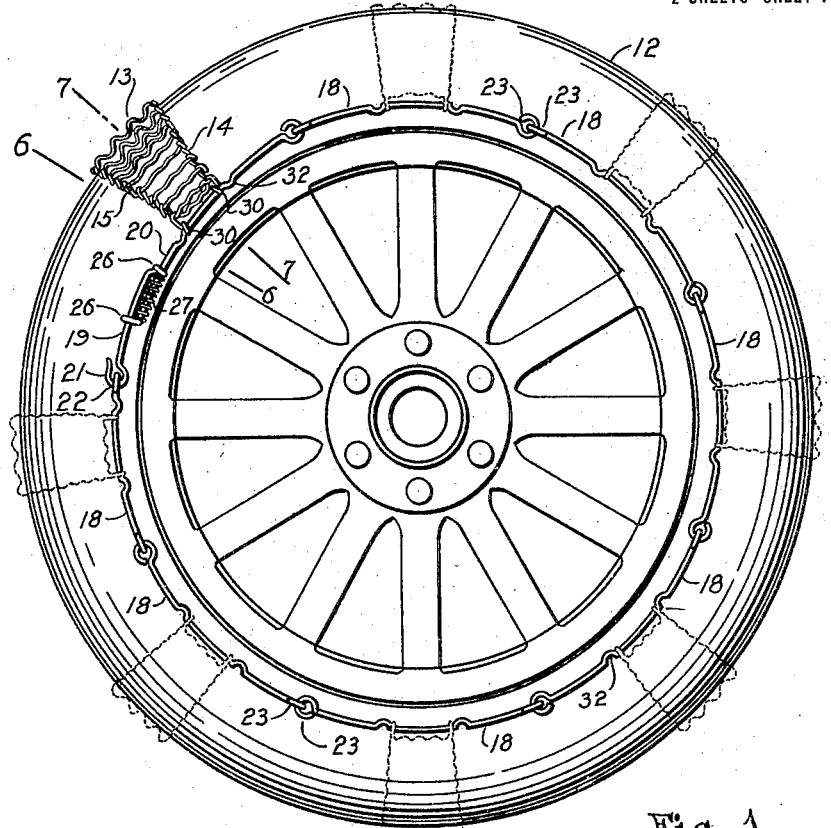
Fig. 1.
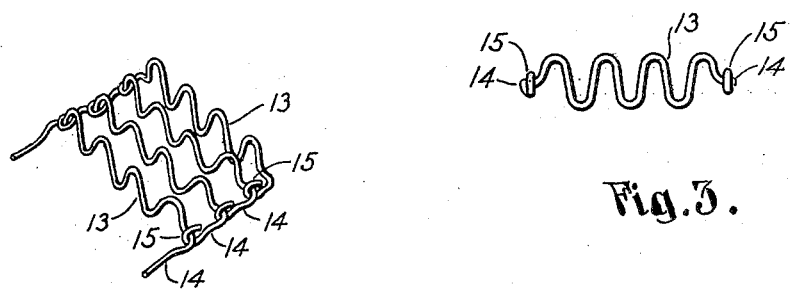
Fig. 2.
Fig. 3.
Inventor:
William T. Rollins
Attys.

W. T. ROLLINS.
ANTISKID ATTACHMENT FOR ELASTIC TIRES.
APPLICATION FILED FEB. 10, 1921.
1,397,182.
Patented Nov. 15, 1921.
2 SHEETS—SHEET 2.
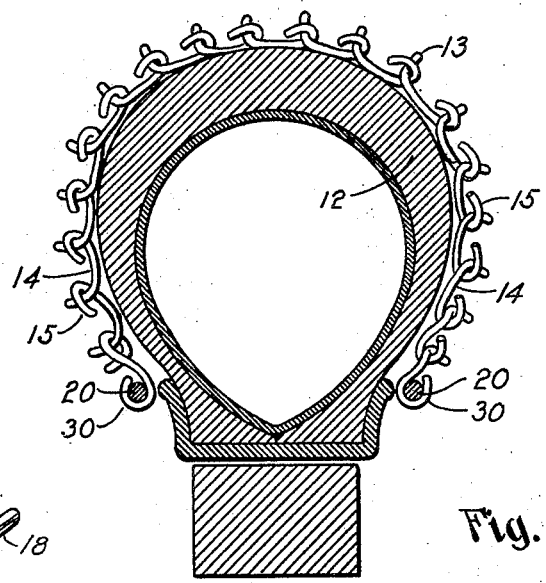
Fig. 6
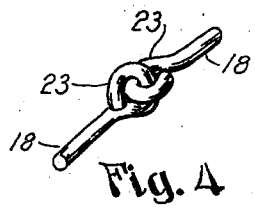
Fig. 4
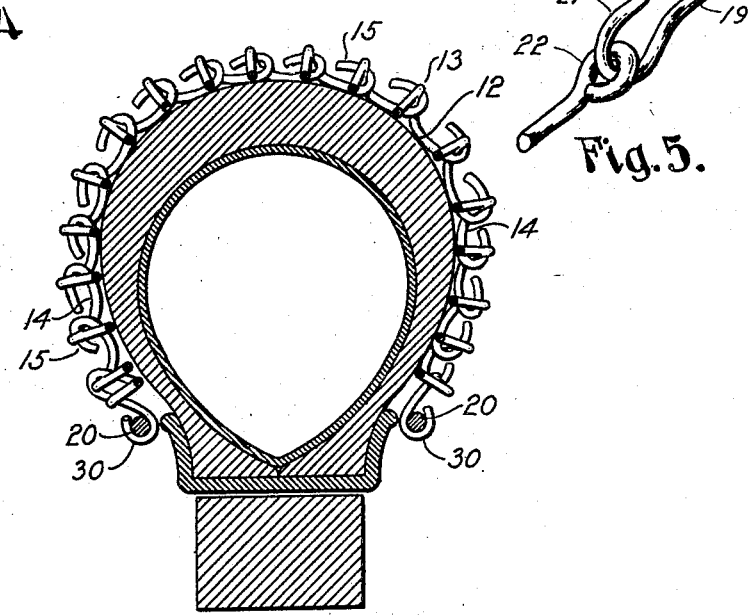
Fig. 5.
Fig. 7
Inventor
William T. Rollins.
by Hughes Brown Lumley May
Attys.

UNITED STATES PATENT OFFICE.

WILLIAM T. ROLLINS, OF BOSTON, MASSACHUSETTS, ASSIGNOR, BY DIRECT AND MESNE ASSIGNMENTS, OF ONE-FOURTH TO WILLIAM H. DAVIS AND ONE-HALF TO EUGENE F. LALLY, BOTH OF BOSTON, MASSACHUSETTS.

ANTISKID ATTACHMENT FOR ELASTIC TIRES.

1,397,182.  Specification of Letters Patent.  Patented Nov. 15, 1921.

Application filed February 10, 1921. Serial No. 443,767.

*To all whom it may concern:*

Be it known that I, WILLIAM T. ROLLINS, a citizen of the United States, residing at Boston, in the county of Suffolk and State of Massachusetts, have invented new and useful Improvements in Antiskid Attachments for Elastic Tires, of which the following is a specification.

This invention relates to flexible attachments for the elastic tires of motor vehicle wheels, forming track-engaging projections on the tread surfaces of such tires to prevent circumferential slipping, and side slipping or skidding.

The object of the invention is to provide an attachment adapted to more effectually prevent side slipping or skidding than other attachments now in use, and also adapted to be conveniently and quickly applied, and removed and folded in small compass when not in use.

The invention is embodied in the improvements which I will now proceed to describe and claim.

Of the accompanying drawings forming a part of this specification,—

Figure 1 is a side elevation of a wheel, the tire of which is equipped with an attachment embodying the invention, portions of the attachment being shown conventionally by dotted lines.

Fig. 2 is a perspective view showing a portion of one of the mats shown by Fig. 1.

Fig. 3 is a side view of one of the mat units.

Figs. 4 and 5 are fragmentary perspective views, showing portions of one of the confining rings.

Fig. 6 is a section on line 6—6 of Fig. 1.

Fig. 7 is a section on line 7—7 of Fig. 1.

The same reference characters indicate the same parts in all of the figures.

My attachment is composed of a plurality of spaced apart flexible mats. each formed to extend across the tread portion of an elastic tire 12, and to bear on opposite side portions of the tire, each mat being of the side-slip or skid-resisting construction hereinafter described, and confining rings engaged with opposite ends of the mats and adapted to confine the same upon the tread and side portions, the confining rings embodying certain novel features also described hereinafter.

Each mat is preferably composed of a plurality of spaced apart sinuous wire units 13, extending substantially parallel with each other and interengaged at their opposite ends to form flexible selvage edges extending lengthwise of the mat, each mat being oblong and its longitudinal selvage edges extending crosswise of the tire.

The preferred construction whereby said selvage edges are formed, is best shown by Fig. 2, which shows four of the wire units, one of which is incomplete. Each unit 13 is bent to form end arms 14, extending substantially at right angles with the sinuous portion. Said arms bridge the spaces between the adjacent units, and on each arm is formed a loop or eye 15, embracing the end portion of the next unit.

Each unit 13 presents inner bends bearing on the tire, and outer bends standing out from the tire. The sides of the bends in the units which stand out from the tread portion, face opposite sides of the tire, and extend longitudinally of the periphery of the tire, so that the bends are arranged to engage the road and resist side slipping or skidding of the tire. In other words, the bends are pressed sidewise against the road material by force tending to cause the tire to slip sidewise, so that they offer greater resistance to side slipping than to peripheral slipping or spinning of the tire.

As shown by Figs. 6 and 7, the sides of the bends radiate from the surface of the tire, and are substantially perpendicular to said surface, so that each of the bends projecting from the tread portion presents two sides, adapted to effectively resist side slipping of the tire in either direction.

Each of the above-mentioned confining rings is preferably composed of arcuate sections, of which there may be any desired number. Two adjacent sections are separably connected, so that the rings may be conveniently closed and opened to permit the application and removal of the attachment, the sections being loosely jointed together, so that the attachment may be folded compactly when not in use. One of the sections of each ring is preferably of variable length, or telescopic, and composed of two members, each adapted to slide on the other, so that the diameter of the ring is variable, a take-up spring being engaged with said members, and adapted to yieldingly contract the ring. The other sections of the ring are preferably continuous, or non-telescopic.

The specified construction of each of the rings is shown by Fig. 1, from which it will be seen that the ring is composed of a plurality of continuous or non-telescopic arcuate sections 18, and a telescopic section composed of members 19 and 20. Provision is made for separably connecting two of the sections, preferably by forming on the member 19 of the telescopic section an open hook 21, and on the adjacent section 18, a closed eye 22, said hook and eye being separably interengaged. (See Fig. 5.) The sections are elsewhere inseparably connected or loosely jointed together by interengaged closed eyes 23. (See Fig. 4.)

Each of the members 19 and 20 forming the telescopic section, is provided with an eye 26, embracing and adapted to slide on the other member. Between said eyes is interposed a take-up spring 27, which is normally compressed, and tends, by its effort to expand, to shorten the telescopic section and contract the ring, and thus prevent liability of the accidental separation of the hook 21 from the eye 22.

As shown by Figs. 1, 6 and 7, the ends of the mats are provided with eyes 30, embracing portions of the rings, the eyes on the mats shown by Figs. 6 and 7 embracing the members 20 of the telescopic section. The eyes on the other mats embrace the sections 18. To prevent the mats from sliding edgewise on the rings, the ring sections may be provided with bends 32, forming stops against which the mat eyes 30 abut, as shown by Fig. 1.

Each of the mat units presents oppositely facing sides extending crosswise of the mat and longitudinally of the periphery of the tire, and standing substantially perpendicular to a portion of the tire, and a sinuous outer edge standing out from the tire. While I prefer to make said units of wire, I am not limited to this material.

The arms 14 conform to the cross-sectional curvature of the tire, and are arranged substantially at right angles with the sides of the units 13, so that they cause the sides of the units to stand substantially perpendicular to the surface of the tire.

I claim:

1. An anti-skid attachment for elastic tires, comprising a plurality of flexible spaced apart mats, each formed to bear on the tread portion and on opposite side portions of a tire, and confining means engaged with opposite ends of the mats to confine the same upon the tire, each mat being composed of a plurality of spaced apart units extending substantially parallel with each other crosswise of the mat, and having looped arms extending across the spaces between the units, and embracing the end portions of the next unit, whereby flexible selvage edges are formed, each unit bearing on the tire and having an outer edge standing out from the tire and arranged to resist side slipping or skidding of the tire.

2. An anti-skid attachment for elastic tires, comprising a plurality of flexible spaced apart wire mats, each formed to bear on the tread portion, and on opposite side portions, of the tire, and confining means engaged with opposite ends of the mats, and adapted to confine the same upon the tire, each mat being composed of a plurality of spaced apart sinuous wire units, extending substantially parallel with each other crosswise of the mat, and interengaged at their opposite ends to form flexible selvage edges, each unit having inner bends bearing on the tire, and outer bends standing out from the tire and arranged to resist side slipping or skidding of the tire.

3. An anti-skid attachment for elastic tires, comprising a plurality of flexible spaced apart wire mats, each formed to bear on the tread portion, and on opposite side portions, of the tire, and confining means engaged with opposite ends of the mats, and adapted to confine the same upon the tire, each mat being composed of a plurality of spaced apart sinuous wire units, extending substantially parallel with each other crosswise of the mat, and having looped arms extending across the spaces between the units, and embracing the end portions of the next unit, whereby flexible selvage edges are formed, each unit having inner bends bearing on the tire, and outer bends standing out from the tire and arranged to resist side slipping or skidding of the tire.

In testimony whereof I have affixed my signature.

WILLIAM T. ROLLINS.